US012708982B2

(12) United States Patent
Naderer

(10) Patent No.: US 12,708,982 B2
(45) Date of Patent: Aug. 18, 2026

(54) MACHINE TOOL FOR THE ROBOT-SUPPORTED MACHINING OF WORKPIECES WITH TWO ROTATABLE TOOLS

(71) Applicant: FerRobotics Compliant Robot Technology GmbH, Linz (AT)

(72) Inventor: Ronald Naderer, Linz (AT)

(73) Assignee: FerRobotics Compliant Robot Technology GmbH, Linz (AT)

(*) Notice: Subject to any disclaimer, the term of this patent is extended or adjusted under 35 U.S.C. 154(b) by 430 days.

(21) Appl. No.: 18/039,095

(22) PCT Filed: Nov. 30, 2021

(86) PCT No.: PCT/EP2021/083583
§ 371 (c)(1),
(2) Date: May 26, 2023

(87) PCT Pub. No.: WO2022/117568
PCT Pub. Date: Jun. 9, 2022

(65) Prior Publication Data

US 2023/0415301 A1 Dec. 28, 2023

(30) Foreign Application Priority Data

Dec. 2, 2020 (DE) ......................... 102020131967.3

(51) Int. Cl.
*B24B 47/10* (2006.01)
*B23Q 39/02* (2006.01)

(52) U.S. Cl.
CPC ............ *B24B 47/10* (2013.01); *B23Q 39/024* (2013.01)

(58) Field of Classification Search
CPC ........ B24B 47/10; B24B 41/04; B23Q 39/024
See application file for complete search history.

(56) References Cited

U.S. PATENT DOCUMENTS

| | | | | |
|---|---|---|---|---|
| 2,975,563 | A * | 3/1961 | Bovensiepen | B24B 47/10 74/324 |
| 2019/0232502 | A1* | 8/2019 | Naderer | B24B 41/002 |

FOREIGN PATENT DOCUMENTS

| | | | | |
|---|---|---|---|---|
| EP | 0455853 | A1 * | 11/1991 | B23Q 39/025 |
| EP | 0990469 | A2 * | 4/2000 | B21D 5/08 |

(Continued)

OTHER PUBLICATIONS

Russ Alexander Publication Nov. 13, 1991 retrieved translation from ESPACENET: https://translationportal.epo.org/emtp/translate/?ACTION=description-retrieval&COUNTRY=EP&ENGINE=google&FORMAT=docdb&KIND=A1&LOCALE=en_EP&NUMBER=0455853&SRCLANG=de&TRGLANG=en (Year: 1991).*

(Continued)

*Primary Examiner* — Monica S Carter
*Assistant Examiner* — Christopher Soto
(74) *Attorney, Agent, or Firm* — Murphy, Bilak & Homiller, PLLC

(57) ABSTRACT

Various embodiments relate to a machine tool, in particular for the robot-assisted machining of workpieces. The machine tool comprises a drive and a first shaft with a mounting point for a first tool and a second shaft with a mounting point for a second tool. The drive is coupled to the first shaft directly or indirectly via a first freewheel coupling and to the second shaft directly or indirectly via a second freewheel coupling such that the drive drives the first or second shaft on the basis of the rotational direction. The invention additionally relates to a corresponding method for the robot-assisted machining of a workpiece using machine tool.

9 Claims, 5 Drawing Sheets

(56) References Cited

FOREIGN PATENT DOCUMENTS

| | | | | |
|---|---|---|---|---|
| JP | S57202647 U | | 12/1982 | |
| JP | S60186392 A | | 9/1985 | |
| JP | H02237734 A | | 9/1990 | |
| JP | H04366716 A | * | 12/1992 | ........... G01D 5/2013 |
| JP | H0885085 A | | 4/1996 | |
| JP | H10309687 A | | 11/1998 | |
| JP | 2019534165 A | | 11/2019 | |
| WO | 2018055189 A1 | | 3/2018 | |

OTHER PUBLICATIONS

Ururitsuhi Shiyurodaa Publication Dec. 18, 1992 retrieved translation from ESPACENET:https://worldwide.espacenet.com/patent/search/family/009409874/publication/JPH04366716A?q=JPH04366716A (Year: 1992).*

Wolgast Peter Publication Apr. 5, 2000 retrieved translation from ESPACENET: https://worldwide.espacenet.com/patent/search/family/008063316/publication/EP0990469A2?q=EP%200990469%20A2 (Year: 2000).*

RUSS Publication Nov. 13, 1991 retrieved translation from ESPACENET: https://worldwide.espacenet.com/patent/search/family/008203964/publication/EP0455853A1?q=EP%200455853%20A1 (Year: 1991).*

* cited by examiner

MACHINE TOOL FOR THE ROBOT-SUPPORTED MACHINING OF WORKPIECES WITH TWO ROTATABLE TOOLS

TECHNICAL FIELD

The present disclosure is directed to a machine tool for the robot-supported machining of surfaces.

BACKGROUND

In robot-supported surface machining, a machine tool (e.g. a grinding machine, a drilling machine, a milling machine, a polishing machine, etc.) is guided by a manipulator, for example, an industrial robot. During the machining process, the machine tool can be coupled in various ways to the so-called tool center point (TCP) of the manipulator; the manipulator can generally adjust the machine to any position and orientation needed to move a machine tool along a trajectory, e.g. parallel to the surface of the workpiece. Industrial robots are generally position-controlled, allowing for a precise movement of the TCP along the intended trajectory.

In order to achieve good results in robot-supported grinding, polishing or in other surface machining processes, many application require that the processing force (e.g. grinding force) be regulated, which is difficult to realize with satisfying accuracy using conventional industrial robots. The large and heavy arm segments of an industrial robot have too much mass inertia for a controller (closed-loop controller) to be able to react quickly enough to variations in the processing force. To solve this problem, a linear actuator—smaller (and lighter) in comparison to the industrial robot—can be arranged between the TCP of the manipulator and the grinding machine to couple the TCP of the manipulator to the grinding machine. In this case, the linear actuator only controls the processing force (that is, the contact force between the machine tool and the work piece) during the surface machining, while the manipulator moves the machine tool, together with the linear actuator, position-controlled along the desired trajectory. By adjusting the processing force, the linear actuator can also compensate (within certain limits) for inaccuracies in the positioning and form of the machined workpiece. Industrial robots do exist which are capable of regulating the processing force without the aforementioned linear actuator, by means of force-torque control. In still other applications, the relatively heavy drive unit (e.g. an electromotor or a compressed air engine) of the machine tool and the tool itself (e.g. a grinding disc) mechanically decoupled. Meaning that the relatively heavy drive unit of the grinding machine is fixedly attached to the manipulator and only the comparatively light part of the machine tool, on which the (rotating) tool is mounted, is (force-controllably) moved by the linear actuator. For this purpose, the rotating tool can be connected to the drive by means of a telescopic shaft as described, for example, in the publication US 2019/0232502 A1, the contents of which are acknowledged in their entirety by the reference made in this description.

In many surface machining processes, the tool has to be changed between various processing steps. A tool change may be carried out partially or completely automatically with the support of a robot. Conventional tool-changing stations which, for example, can replace a worn tool or exchange a grinding disc for a polishing disc, can serve this purpose. Nevertheless, despite the possibility of implementing an automated, robot-supported change of tools, doing so frequently can significantly lengthen the total processing time.

The inventor has identified a need for an improved machine tool, which can operate with fewer tool changes and which, in particular, make it possible to carry out numerous machining steps (e.g. grinding and a subsequent polishing) without exchanging the processing tool.

SUMMARY

In the following, a machine tool will be described which can be used for the robot-supported machining of workpieces. In accordance with one embodiment, the machine tool comprises a support, a first shaft, which is mounted on the support and which has a holder for a first tool, as well as a second shaft, which is also mounted on the support and which has a holder for a second tool. The machine tool further comprises a drive shaft, which is (directly or indirectly) mechanically coupled to the first shaft by means of a freewheeling clutch and which is also mechanically coupled to the second shaft by means of a second freewheeling clutch. In one embodiment, the first freewheeling clutch and the second freewheeling clutch can be arranged such that, when the drive shaft rotates in a first direction, the first shaft is driven, and when the drive shaft rotates in a second direction, the second shaft is driven.

In accordance with a further embodiment, the machine tool comprises a drive unit, as well as a first shaft which has a mounting site for a first tool and a second shaft which has a mounting site for a second tool. The drive unit is directly or indirectly coupled to the first shaft by means of a first freewheeling clutch, and by means of a second freewheeling clutch it is coupled to the second shaft such that the drive unit drives the first or the second shaft depending on the direction of rotation. Still further, a corresponding method for the robot-supported machining of a workpiece using a machine tool will be described.

SHORT DESCRIPTION OF THE FIGURES

Various implementations will now be described with reference to the examples illustrated in the drawings. The illustrations are not necessarily to scale and the embodiments are not limited to the aspects illustrated here. Instead, emphasis is placed on illustrating the basic principles underlying the illustrated embodiments.

DETAILED DESCRIPTION

Robots and manipulators for moving machine tools along a trajectory, for example, in order to automatedly machine the surface of a workpiece, are widely known. Since the processing force applied during the robot-supported machining of a workpiece plays an important role, various concepts for regulating the force have been developed. The processing force is the force exerted between the rotating tool and the workpiece during the machining process, for example, the force exerted by a grinding disc on the surface of the workpiece during a grinding process.

The embodiments described here are suitable, inter alia, for force regulation with a linear actuator, such as the one described in the publication US 2019/0232502 A1. In some embodiments, the rotating tool is mounted on a front side of the machine tool, whereas the drive unit (e.g. an electromotor) for the rotating tool is mounted on the back side of the machine tool. The back side of the machine tool is also connected to the robot/manipulator. Between the front and back sides, the aforementioned linear actuator is disposed. For the transmission of the rotational movement, a telescope shaft, which can compensate changes in the deflection of the actuator, is arranged between the motor on the back side of the machine tool and the tool on the front side of the machine tool. In other embodiments, the motor is arranged on the front side of the machine tool, in which case no telescope shaft is needed.

At this point is should be noted that the concepts described here can also be employed with machine tools without an integrated linear actuator. In the absence of an integrated linear actuator, a telescope shaft is also not needed. In such cases the force regulation is either carried out directly by the robot/manipulator (a robot with force-torque control), or the linear actuator is not integrated in the machine tool but is instead arranged between the robot and the machine tool. The embodiments described here mainly concern the clutch of the shaft driven by the motor (a telescope shaft or a normal shaft or the motor shaft), which has two rotating tools.

Figure 1:
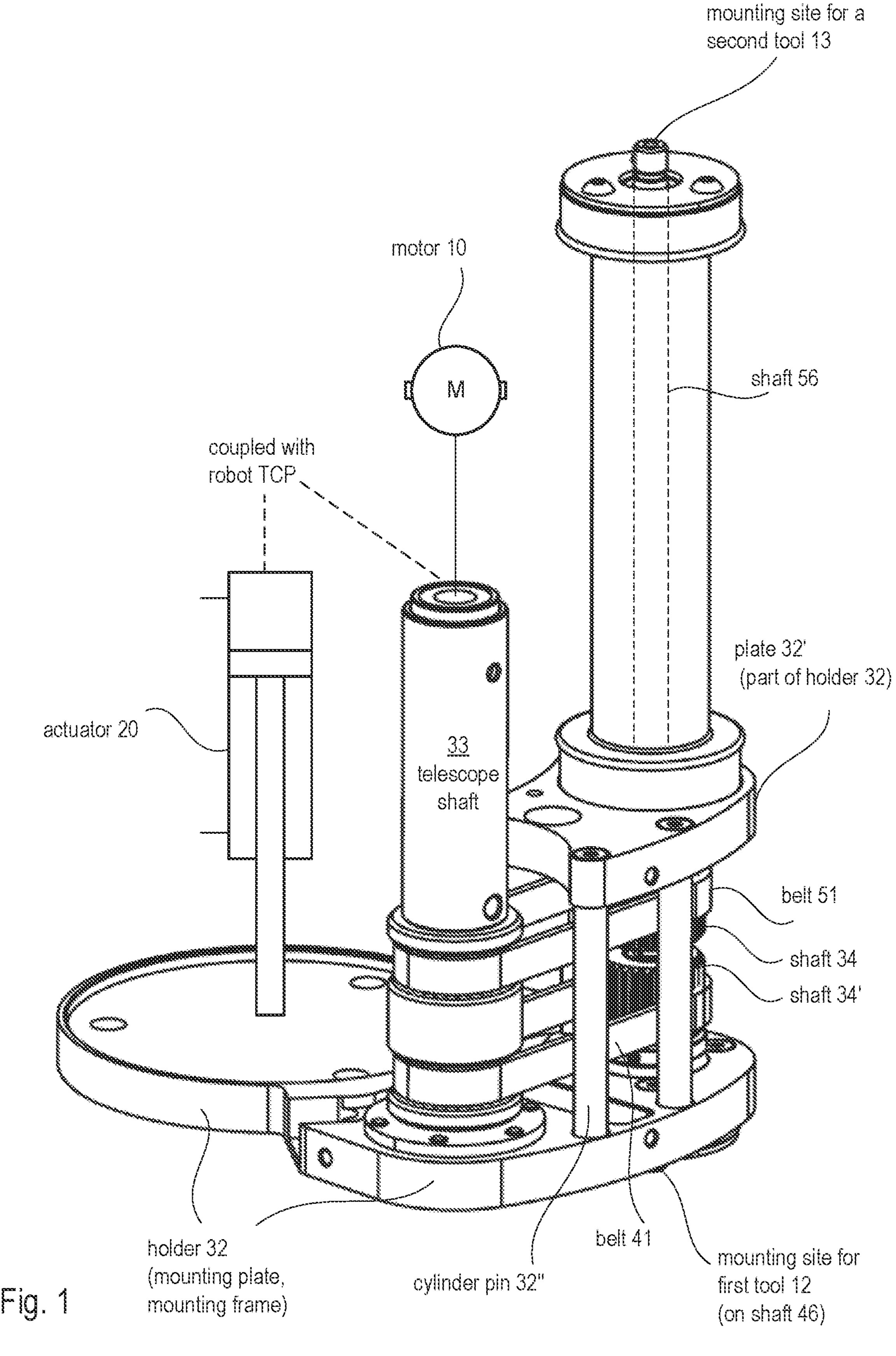
FIG. 1 is a perspective illustration of an embodiment of a machine tool for the robot-supported machining of surfaces, wherein the machine tool can hold two rotating tools on two opposite sides.

FIG. 1 illustrates a machine tool having an integrated linear actuator and a telescopic shaft, wherein only the front side of the machine tool is shown and the linear actuator is only schematically drawn. The front side of the machine tool substantially comprises a holder 32, which may be, for example, a mounting plate, a mounting frame, a housing part or similar. The holder 32 can be comprised of numerous parts which are rigidly connected to each other (and which together form, for example, a mounting frame). In the example illustrated in FIG. 1, for example, the plate 32' and the cylinder pin 32" are part of the holder 32. The back side of the machine tool may also comprise a mounting plate (not shown) which, for example, is connected to the TCP (tool center point) of a robot/manipulator. The linear actuator 20—here only schematically illustrated—couples the back side of the machine tool, on which the motor 10 is also mounted, to the holder 32 on the front side of the machine tool. The linear actuator 20 can comprise, for example, a double acting pneumatic cylinder and a linear guide.

The telescope shaft 33 illustrated in FIG. 1 is mounted at the end of the shaft on the holder 32 (mounting plate), for example, by means of a ball bearing. The other shaft end of the telescope shaft is directly or indirectly coupled to the motor shaft of the motor 10. The telescopic shaft 33 drives the shafts 34 and 34' via the belts 41 and 51 which, in the example shown here, are arranged substantially parallel to the telescopic shaft 33 (the shafts are parallel when their axes of rotation are parallel). The shafts 34 and 34' are mounted on the holder 32 (e.g. on the plate 32' and on the mounting plate of the holder 32). The telescopic shaft 33, as well as the shafts 34 and 34', are drive shafts, suitable for driving the tools 12 and 13.

Shafts 34 and 34' are coupled to the first tool 12 and to a second tool 13, in order to drive them. The two tools 12 and 13 may be, for example, different grinding discs, a grinding disc and a polishing disc, a milling cutter and a grinding disc or any other pair of tools. Since the two shafts 34 and 34' are driven by the shaft 33 via belts, the shafts 34 and 34' always rotate synchronically, although they may revolve at different rotational frequencies if the belt drives have differing transmission ratios. For this reason, in some embodiments, instead of the shafts 34 and 34', only a single shaft, driven by a single belt, is provided. The coupling of the shaft 34 to the rotating tools 12 and 13 is schematically illustrated in FIG. 2 and will be discussed in detail in the following.

Figure 2:
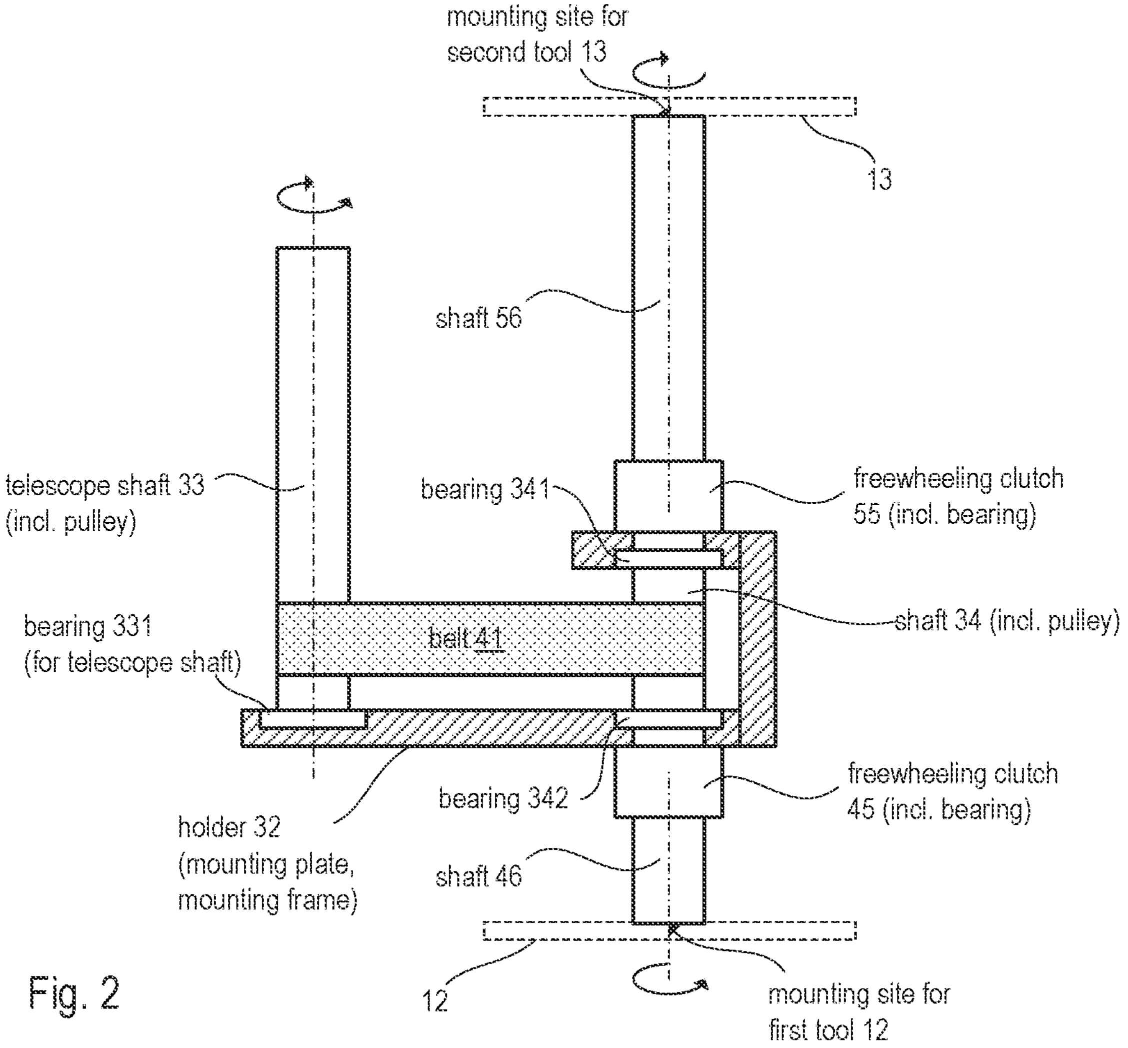
FIG. 2 shows a simplified cross section (the longitudinal section) of a machine tool in accordance with a further embodiment.

FIG. 2 shows the bearing 331 (e.g. a ball bearing or a needle bearing), by means of which the telescopic shaft 33 (the drive shaft connected to the motor 10) is rotatably mounted on the holder 32. FIG. 2 also shows the bearings 342 and 341, by means of which the shaft 34 is mounted on the holder 32 and/or plate 32'. As mentioned above, in such a case only a single belt 41 is needed for coupling the shafts 33 and 34. The shafts 46 and 56 are arranged coaxially to the shaft 34, wherein the shaft 46 is coupled to a first end of the shaft 34 by means of a first freewheeling clutch 45, and wherein the shaft 56 is coupled to a second end of the shaft 34 by means of a second freewheeling clutch 55. The tools 12 and/or 13 can be mounted on the outwardly disposed (i.e. opposite the freewheeling clutches 45 and 55) ends of the shafts 46 and 56 (see also FIG. 1).

The freewheeling clutches (or overrunning clutches) 45 and 55 may be implemented, for example, as a freewheeling sleeve clutch (drawn cup roller clutch). Drawn cup roller clutches are overrunning clutches (one-way clutches) which are generally comprised of thin-walled outer rings, formed without cutting (non-cut outer cups) having clamping frames, plastic cages, pressure springs and needle rollers. They only transfer torque in one direction and save radial space. There are freewheeling clutches with and without a bearing. When not loaded, drawn cup roller clutches exhibit relatively little frictional torque (overrunning frictional torque). Drawn cup roller clutches and other freewheeling clutches are widely known and are commercially available from various manufacturers (e.g. from the firm Schaeffler). They will therefore not be described here in greater detail.

The freewheeling clutches 45 and 55 are mounted such that, when the shafts 33 and 34 rotate to the left, the shaft 46 (first tool shaft) is driven via the freewheeling clutch 45, whereas the freewheeling clutch 55 is not loaded and therefore does not transfer any significant torque to the shaft 56 (second tool shaft). When the shafts 33 and 34 rotate to the right, it is the other way around; the shaft 56 is driven via the freewheeling clutch 55, whereas the freewheeling clutch 45 is unloaded and does not transfer any significant torque to the shaft 46. When they are idle, the freewheeling clutches 45 and 55 transfer a torque that only reaches the level of the frictional torque.

During the robot-supported machining of a workpiece, the workpiece may first be machined using a first grinding disc (e.g. tool 12), which is mounted on the shaft 46. Here the motor 10 (see FIG. 1), and thus also the shafts 33 and 34, rotate to the left. In order to change the tool so that the workpiece can be machined with a second grinding disc (e.g. tool 13), which is mounted on the shaft 56, the robot only has to turn the machine tool around (a 180° rotation around an axis of rotation that lies in the plane which is orthogonal to the axis of rotation of the shaft 33), and reverse the direction in which the motor 10 rotates. While the workpiece is being machined with the second grinding disc, the motor rotates to the right. In other embodiments, all of the directions of rotations may be inverted. As mentioned, the shaft 34 may be comprised of two parts, in which case two belts are needed (as in the example from FIG. 1). The transmission ratios of the two belt drives may then differ.

Figure 3:
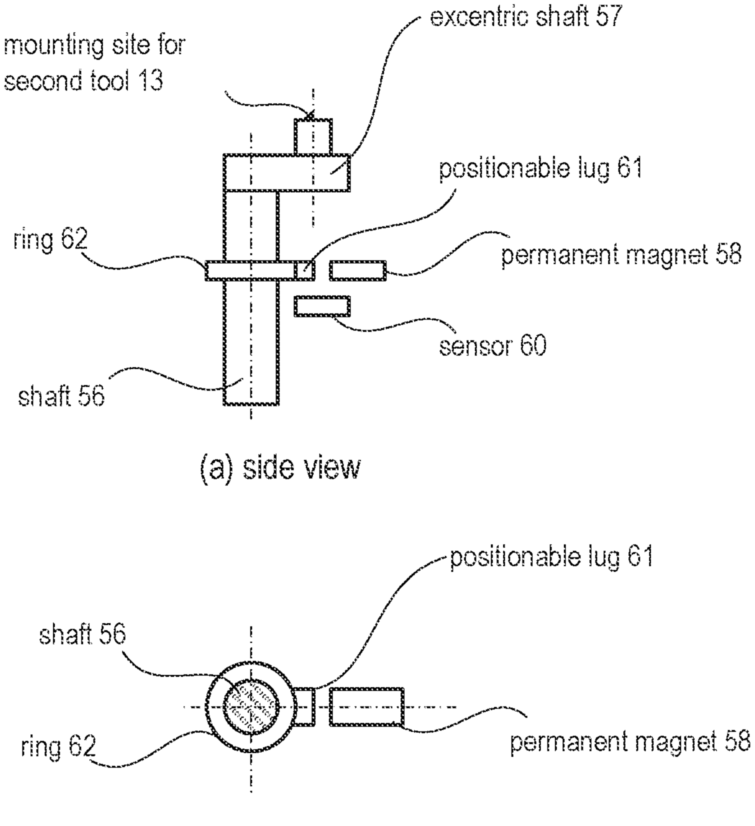
FIG. 3 shows a modification and further development of the example from FIG. 2, wherein the tools are driven by means of eccentric shafts.

FIG. 3 shows a modification/further development of the example from FIG. 2. This modification/further development concerns in equal measure the shafts 46 and 56. To simplify the illustration, only the part of the machine tool with the shaft 56 is shown. In this embodiment, the outer end of the shaft 56 is coupled to an eccentric shaft 57, as is commonly the case in eccentric grinders or orbital grinders. Grinding machines with eccentric shafts are widely known and will therefore not be discussed here further.

Further, in the example from FIG. 3 a tab, lug or a similar element 61 is connected to the shaft 56, which protrudes asymmetrically from the shaft 56. The element 61 may, in particular, be arranged on a ring 62 or sleeve which extends around the shaft 56. The ring 62 can be clamped onto the shaft 56 in any desired angular position in order to adjust the angularity of the element 61. A magnet 58, in particular a permanent magnet, may be arranged in the vicinity of the element 61 (the lug). If the element 61 is made of ferromagnetic material (e.g. ferritic tool steel), the magnet 58 will pull the element 61, and with it the shaft 56, into a defined angular position, which may also be referred to as the reference position (see diagram (a) of FIG. 3, the lug 61 and the magnet 58 are disposed directly opposite each other). The arrangement of magnet 58 and element 61 may also be dimensioned such that the overrunning frictional torque of the freewheeling clutch 55 does not suffice to rotate the shaft out of this defined position. This ensures that, when the motor 10 rotates to the left, the shaft 56 remains at a standstill and is not also set in motion by the overrunning frictional torque of the freewheeling clutch 55. An unintended accompanying rotation of the shaft 56 when the motor 10 rotates to the left could possibly, for example, fling residual material 13 (e.g. dust particles, polishing agents, etc.) off of the tool. This is prevented by the magnet 58. The same applies to the shaft 46 and the tool 12 when the motor rotates to the right. This arrangement comprised of a magnet 58 and an element 61 can also be useful in machines which do not have an eccentric shaft.

Additionally or as an alternative to the permanent magnet 58, the machine tool may also comprise a sensor which is arranged to detect a specific angular position of the shaft 56. The sensor may be, for example, an optical sensor (e.g. a retro-reflective light barrier) or some other type of proximity sensor which essentially detects whether the element 61 and/or the shaft 56 are in the reference position. When the shaft 56 is in the reference position, the eccentric shaft 57 is also in the reference position, which may be useful for the automated change of the tool 13.

The shaft 46 (not shown in FIG. 3) may also comprise a ring with an asymmetrically projecting element which is attracted by the magnet in order to pull the shaft into a reference position and to thereby prevent the shaft 46 from also being set in motion by the overrunning frictional torque when the freewheeling clutch 45 is idle. A sensor for detecting the reference position may also be provided here. In order to avoid unnecessary repetition, for further details reference is made to the description above regarding FIG. 3. In other embodiments, instead of the magnet 58, a frictional lining is provided or one or more latching rollers, which are also suitable for ensuring that the respective shaft 46, 56 is not set in motion by the overrunning frictional torque of the respective freewheeling clutch.

Figure 4:
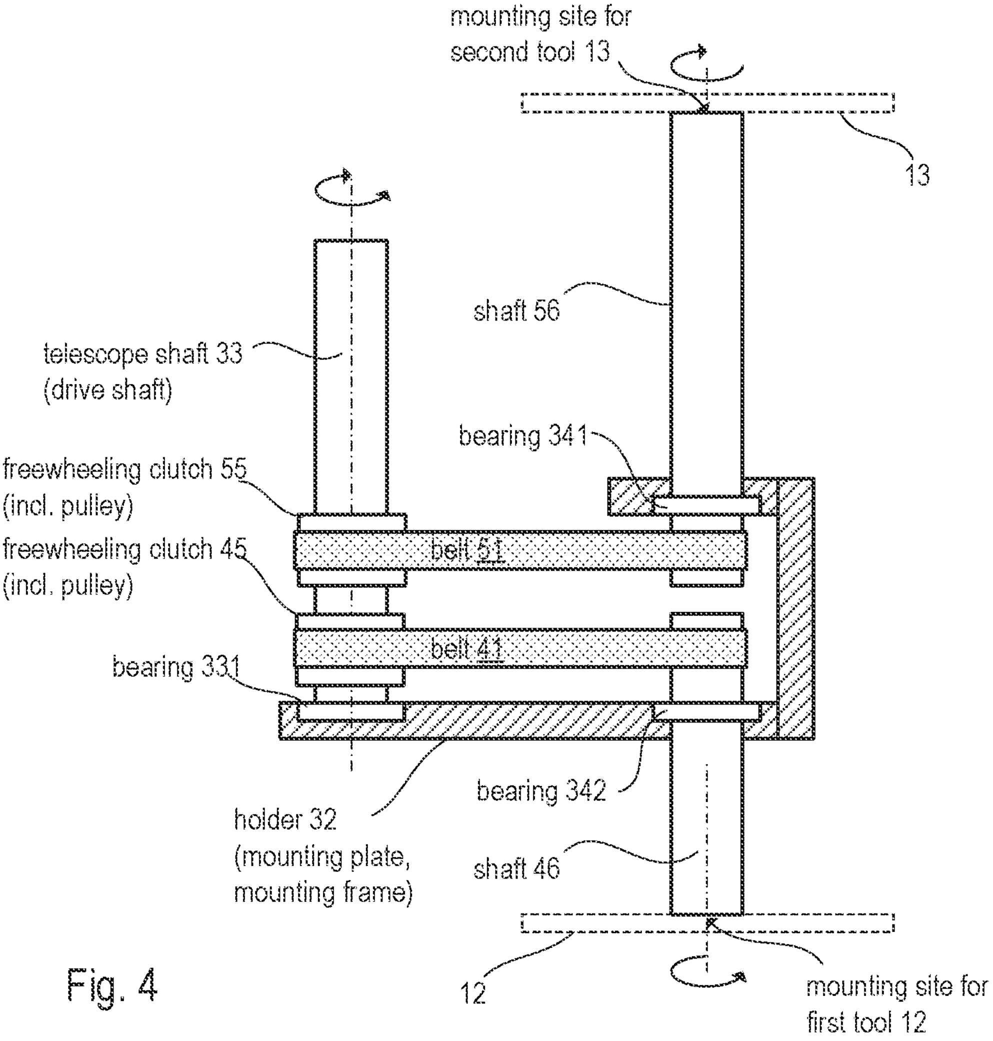
FIG. 4 shows a modification of the example from FIG. 2.

FIG. 4 shows a modification of the example from FIG. 2. In this example, as in FIG. 1, two belts 41 and 51 are used, while the freewheel sleeves 45 and 55 are arranged on the other side of the belt drive than in the example from FIG. 1. The functioning of the mechanism, however, is essentially the same as in the examples discussed further above. The freewheeling clutches 45 and 55 are mounted on the shaft 33 (e.g. a telescope shaft, a normal drive shaft or a motor shaft) such that, when the shaft 33 rotates to the left, the freewheeling sleeve 45 can transmit the torque and, consequently, the shaft 46 (first tool shaft) is driven by means of the belt 41, while the freewheeling sleeve 55 is idle. When the shaft 33 rotates to the right it is the other way around; in this case only the freewheel sleeve 55 can transmit the torque and the shaft 56 is driven by the belt 41 while the freewheel sleeve 45 is idle. A pulley may be arranged on the exterior of the freewheel sleeves 45 and 55. Depending on the rotational direction of the shaft 33, either the one or the other pulley will be set into motion by the shaft 33. It should be understood that, in the example from FIG. 4, the shafts 33, 46 and 56 are not only mounted at one end (see FIG. 4, bearings 331, 341 and 342), but may also be mounted at other positions, as well, although this is not explicitly shown in FIG. 4 for the sake of simplicity.

Figure 5:
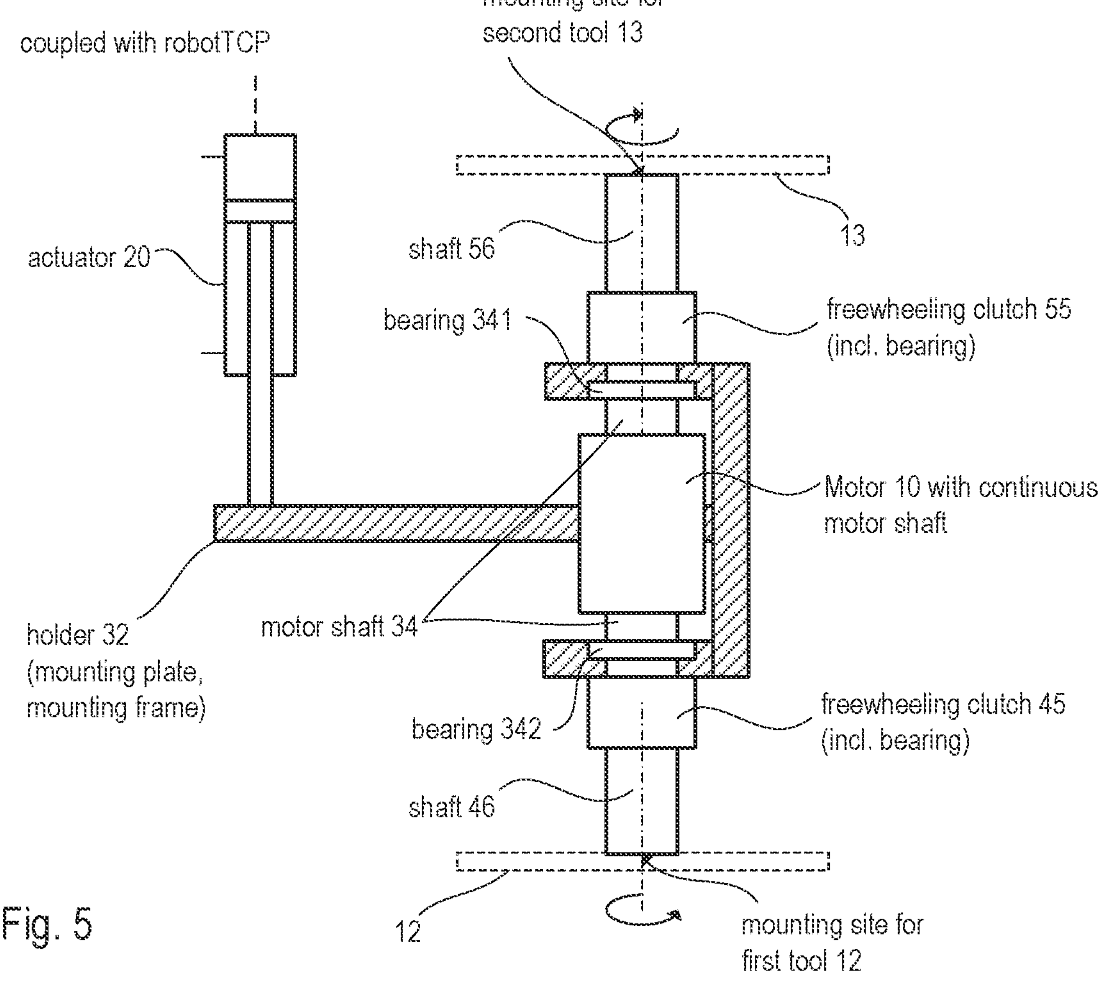
FIG. 5 illustrates a further embodiment in which a motor directly drives the shafts on which the tools are mounted.

FIG. 5 illustrates a further embodiment, which can be regarded as a modification of the example from FIG. 2. In this example, the drive shaft 33 and the belt drive have been replaced by a motor 10 which drives the tool shafts 46 and 56 directly (without gears). The shaft 34 in this case is the motor shaft, which protrudes from both sides of the motor housing. The ends of the motor shafts are coupled to the tool shafts 46 and 56 on which the tools are mounted by means of freewheeling clutches 45 and 55. The freewheeling clutches 45 and 55 function in this example just like the example from FIG. 2 and reference is made to the respective description above for further details.

As one can see in FIG. 5, a telescope shaft is not needed in this example. The motor 10 is mounted on the front side of the machine tool. Nevertheless, a linear actuator 20 (not explicitly illustrated here) may be disposed between the front side of the machine tool (holder 32) and the back side of the machine tool. The back side of the machine tool may be mounted at the TCP of a robot.

In the following, various aspects of the embodiments described here will be summarized. It will be noted that this should not be understood as a complete enumeration, but rather as an exemplary overview. One embodiment concerns a machine tool which can be used for the robot-supported machining of workpieces. The machine tool comprises a support, a first shaft (see FIG. 2, shaft 46) which is mounted on the support and which comprises a holder for a first tool (e.g. a grinding disc 12), and further comprises a second shaft (see FIG. 2, shaft 56) which is mounted on the support and which comprises a holder for a second tool (e.g. a polishing disc). The machine tool further comprises (at least) one drive shaft (see FIG. 2, telescopic shaft 33 and shaft 34, or FIG. 1, partial shafts 34 and 34') which is (directly or indirectly) mechanically coupled to the first shaft by means of a freewheeling clutch and which is mechanically coupled to the second shaft by means of a second freewheeling clutch (see FIG. 2, sleeve freewheeling clutches 45 and 55).

The drive shaft can be coupled to the first and second (tool) shafts by means of a first and a second belt drive (see, e.g. FIG. 4, belts 41, 51). The freewheel clutches can be arranged on either the input sides (cf. FIG. 4) or on the output sides (cf. FIG. 2) of the belt drives.

The first freewheeling clutch and the second freewheeling clutch are, oriented in different directions, coupled to the drive shaft. This means that one of the freewheeling clutches is always idle. Accordingly, the two freewheeling clutches can be arranged such that the first shaft is driven when the drive shaft rotates in a first direction, and the second shaft is driven when the drive shaft rotates in a second direction. In one embodiment the machine tool comprises a motor (see FIG. 1, motor 10) which is directly or indirectly coupled to the first drive shaft and which can drive the latter. In FIGS. 1 and 2, the telescopic shaft 33 can be regarded as the drive shaft. It can be, for example, coaxially and mechanically coupled to the motor shaft. The motor 10 is also indirectly coupled to the shaft 34 (or to the partial shafts 34 and 34') by means of the belts (or any other transmission) such that the shaft 34 can also be regarded as being a part of the drive and, subsequently, as a drive shaft.

In one embodiment the motor is directly mechanically coupled to a drive shaft (cf. FIG. 1, drive shaft 33 is coaxial to the motor shaft) and this drive shaft is itself connected to at least one further drive shaft by means of a transmission, in particular a belt drive (cf. FIG. 2, shaft 34 or FIG. 1, partial shafts 34 and 34'). This further drive shaft may be comprised of two partial shafts (see FIG. 1, partial shafts 34 and 23'), both of which are driven by the motor. The motor drives both tools 12 and 13. The splitting of the drive train can take place at different locations in different embodiments. In a further embodiment, the shaft 34 can be the motor shaft (e.g. that of an electromotor or a pneumatic motor, cf. FIG. 5).

In one embodiment a linear actuator is connected to the support of the machine tool. In such a case, one of the drive shafts can be implemented as a telescopic shaft (cf. FIG. 1). The actuator serves first and foremost to adjust the processing force. The telescopic shaft is not needed when the motor is mounted on the front side of the machine tool, on which the tool shafts are also mounted (cf. e.g. FIG. 5).

In accordance with one embodiment, the machine tool comprises a first element (e.g. a ferromagnetic lug) which protrudes asymmetrically from the second shaft (see FIG. 3, shaft 56), as well as a second element (e.g. a magnet) which is unmovable with respect to the support and which is suitable for holding the first element, and with it the second element, as well, in a reference position when it is not being actively driven (i.e. when the respective freewheeling clutch is idle). Alternatively, the first element (which is connected to and rotates with the shaft) may also be a magnet and the second element (which is stationary with respect to the support) may be ferromagnetic. In some embodiments the second element comprises a friction lining or a detent roller.

A further embodiment concerns a method for the robot-supported machining of a workpiece using a machine tool, in which a motor, depending on the direction of rotation, can drive either a first or a second tool by means of two freewheeling clutches. The method comprises the machining of the workpiece using a first rotating tool, which is mounted on a first shaft of the machine tool, the turning of the machine tool and the changing of the direction of rotation of a drive shaft of the machine tool, and the machining of the workpiece using a second rotating tool which is mounted on a second shaft of the machine tool.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the invention.

It will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A machine tool for machining on a workpiece, the machine tool comprising:

a support;

a first shaft mounted on the support and comprising a holder for a first tool;

a second shaft mounted on the support and comprising a holder for a second tool;

a first element asymmetrically protruding from the second shaft; and a second element which is unmovable with respect to the support and which is configured to hold the first element and the second shaft in a reference position when the second shaft is not being actively driven; and a first drive shaft directly or indirectly mechanically coupled to the first shaft by a first freewheeling clutch and directly or indirectly mechanically coupled to the second shaft by a second freewheeling clutch, wherein the first shaft and the second shaft are located coaxially to the first drive shaft.

2. The machine tool of claim 1, wherein the first freewheeling clutch and the second freewheeling clutch are constructed such that the first shaft is driven when the first drive shaft rotates in a first direction, and the second shaft is driven when the first drive shaft rotates in a second direction.

3. The machine tool of claim 1, further comprising:

a motor directly or indirectly coupled to the first drive shaft and configured to drive the first drive shaft.

4. The machine tool of claim 1, further comprising:

a motor connected to a second drive shaft; and at least one belt which couples the second drive shaft and the first drive shaft.

5. The machine tool of claim 4, wherein the second drive shaft is a telescopic shaft.

6. The machine tool of claim 1, further comprising:

an actuator coupled to the holder of the first shaft or the second shaft and configured to exert a force onto the holder.

7. The machine tool of claim 1, wherein the first element is ferromagnetic and the second element is a magnet.

8. The machine tool of claim 1, wherein the first element is a magnet and the second element is ferromagnetic.

9. The machine tool of claim 1, wherein the holder for the first tool at the first shaft and the holder for the second tool at the second shaft are located on two opposite sides of the machine tool.

* * * * *